(No Model.) 2 Sheets—Sheet 1.

A. SCHMID.
ELECTRIC CONVERTER BOX.

No. 404,114. Patented May 28, 1889.

WITNESSES:
George Brown Jr.
Hubert C. Tener

INVENTOR,
ALBERT SCHMID,
Pope, Edgecomb & Gerry
Att'ys.

(No Model.) 2 Sheets—Sheet 2.

A. SCHMID.
ELECTRIC CONVERTER BOX.

No. 404,114. Patented May 28, 1889.

WITNESSES:
George Brown Jr.
J. Ven. Smith

INVENTOR,
ALBERT SCHMID.
Pope, Edgecomb & Very
Att'y.

UNITED STATES PATENT OFFICE.

ALBERT SCHMID, OF ALLEGHENY, ASSIGNOR TO THE WESTINGHOUSE ELECTRIC COMPANY, OF PITTSBURG, PENNSYLVANIA.

ELECTRIC-CONVERTER BOX.

SPECIFICATION forming part of Letters Patent No. 404,114, dated May 28, 1889.

Application filed December 26, 1888. Serial No. 294,569. (No model.)

*To all whom it may concern:*

Be it known that I, ALBERT SCHMID, a citizen of the Republic of Switzerland, residing at Pittsburg, in the county of Allegheny and State of Pennsylvania, have invented certain new and useful Improvements in Electric-Converter Boxes (Case No. 249,) of which the following is a specification.

My invention relates to the construction of electric converters or inductoriums and the boxes for containing the same.

In the construction of electric converters it has been customary to build up the cores from thin sheets or plates of soft iron, which are applied to the coils, as described, for instance, in Letters Patent Nos. 366,347 and 373,038. The plates, when they are inserted in the core, have been temporarily held together by clamps, and then fastened in position by bolts extending from one end plate to the other. The converter is then placed in a suitable box. By my present invention these bolts are dispensed with, and the box in which the converter is placed is so constructed as to hold the core-plates securely in position when the clamps are removed.

Figure 1:
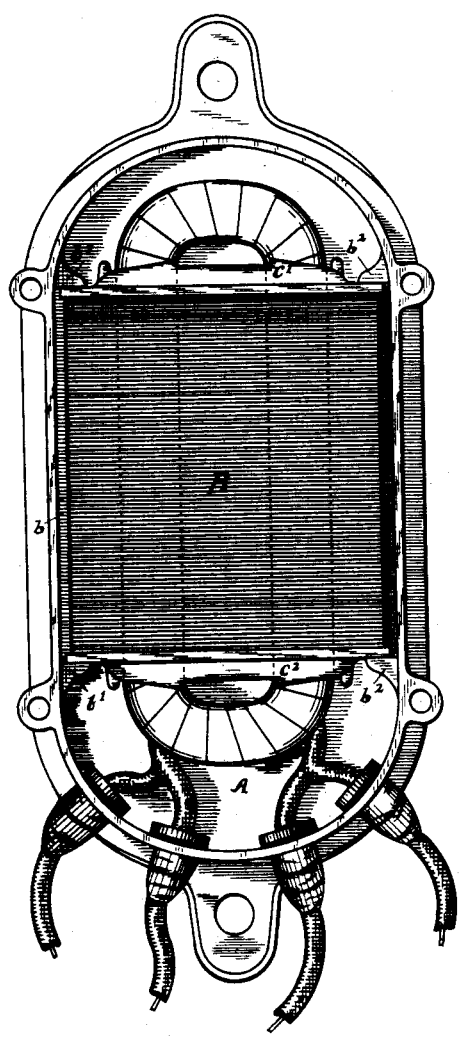
Figure 2:
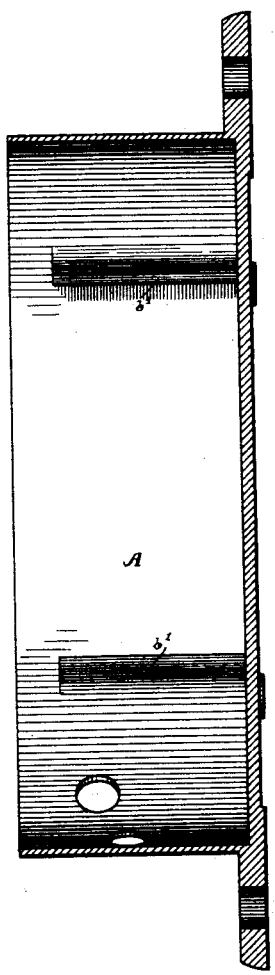
Figure 3:
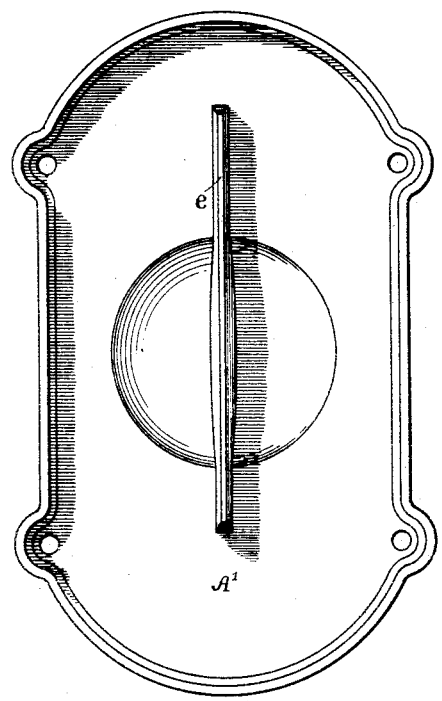
Figure 4:
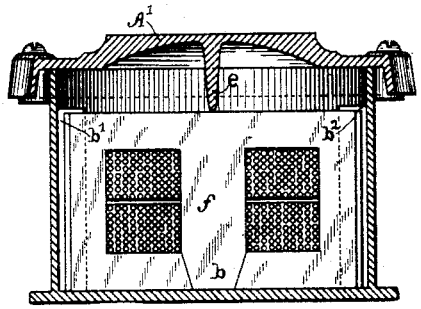

In the accompanying drawings, Figure 1 is a plan, and Fig. 2 a transverse section, of the converter-box, the cover being removed. Fig. 3 is a view of the inside of the cover, and Fig. 4 is a transverse section of the converter and converter-box.

Referring to the figures, B represents the core of a converter built up of soft-iron plates $b$, and A the containing-box of the same. The plates $b$ are constructed to embrace the arms of the coils, and a tongue, $f$, extends through the coils. After the plates $b$ have been applied to the coils in the general manner described in the patents referred to they are pressed firmly together by clamps applied to the respective end plates, $c'$ $c^2$. These end plates may be thick and more rigid than the core-plates, and simply surround the end portions of the coils without extending through them. The converter is then placed in the box A. This is provided with lugs $b'$ $b^2$ at such a distance apart as to permit the end plates of the core to be placed between them. The clamps are then removed, and the tendency for the thin plates $b$ to separate or spring apart causes the end plates, $c'$ $c^2$, to be firmly bound between the lugs. The terminals of the conductors are led out from the box in any suitable manner. The cover A' is applied after the converter is in position. This cover is provided with a longitudinal lug, $e$, projecting toward the converter. This lug serves to hold the converter securely in its position and prevent it from shifting during transportation.

I do not limit the application of my invention to the particular form and shape of converter-plates described, as it is evident that cores having laminæ otherwise constructed may be employed in connection with the converter-boxes.

I claim as my invention—

1. A combined electric converter and converter-box consisting of the coils and core of the converter, the latter being formed of plates of soft iron, and a box having lugs between which the plates of the core are clamped.

2. The combination, with the core of an electric converter composed of thin flat plates of soft iron, of a converter-box having lugs between which the plates are compressed, substantially as described.

3. The combination, with an electric converter having a core composed of thin plates of soft iron surrounding the coils of the converter and having tongues which extend through such coils, of end plates applied to the core, and a converter-box having lugs upon its inner surface between which said end plates are held by pressure.

4. In an electric converter, the combination of the core B, composed of thin plates $b$, a box for the same having the shoulders $b'$, between which the plates are held, and the cover having a lug, $e$, substantially as described.

In testimony whereof I have hereunto subscribed my name this 20th day of December, A. D. 1888.

ALBERT SCHMID.

Witnesses:
W. D. UPTEGRAFF,
CHARLES A. TERRY.